United States Patent
Itoh

(10) Patent No.: US 10,223,516 B2
(45) Date of Patent: Mar. 5, 2019

(54) LOGIN WITH LINKED WEARABLE DEVICE

(71) Applicant: LENOVO (SINGAPORE) PTE. LTD., Singapore (SG)

(72) Inventor: Masaharu Itoh, Yamato (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 70 days.

(21) Appl. No.: 15/177,629

(22) Filed: Jun. 9, 2016

(65) Prior Publication Data

US 2017/0357792 A1 Dec. 14, 2017

(51) Int. Cl.
| | | |
|---|---|---|
| *G06F 21/00* | (2013.01) | |
| *G06F 21/35* | (2013.01) | |
| *H04L 29/06* | (2006.01) | |
| *G06F 21/62* | (2013.01) | |

(52) U.S. Cl.
CPC .......... *G06F 21/35* (2013.01); *G06F 21/6218* (2013.01); *H04L 63/062* (2013.01); *H04L 63/0853* (2013.01); *H04L 63/10* (2013.01)

(58) Field of Classification Search
CPC ....................................................... G06F 21/35
USPC ............................................................ 726/4
See application file for complete search history.

(56) References Cited

U.S. PATENT DOCUMENTS

| | | | | |
|---|---|---|---|---|
| 9,660,984 B2* | 5/2017 | Tan | ...................... | H04L 63/0838 |
| 9,661,185 B2* | 5/2017 | Yokoyama | .............. | H04N 1/442 |
| 9,831,724 B2* | 11/2017 | Copeland | ........... | G07C 9/00007 |
| 9,898,880 B2* | 2/2018 | Nagisetty | ............ | G07C 9/00111 |
| 2015/0028996 A1* | 1/2015 | Agrafioti | ................. | G06F 21/40 340/5.82 |
| 2015/0186636 A1* | 7/2015 | Tharappel | ............... | G06F 21/32 726/8 |
| 2015/0286813 A1* | 10/2015 | Jakobsson | ............... | G06F 21/35 726/9 |
| 2015/0294096 A1* | 10/2015 | Grigg | ...................... | G06F 21/32 726/5 |
| 2017/0093846 A1* | 3/2017 | Lopez Lecube | .... | H04L 63/0853 |

OTHER PUBLICATIONS

Techcruch (https://techcrunch.com/2015/02/12/the-fitbit-charge-hr-brings-back-the-basics/) Feb. 12, 2015.*

* cited by examiner

*Primary Examiner* — Harris C Wang
(74) *Attorney, Agent, or Firm* — Shimokaji IP

(57) ABSTRACT

Disclosed is a login method for controlling user access into a restricted access environment requiring a login device, which may be a wearable device, to effectuate a login process.

15 Claims, 2 Drawing Sheets

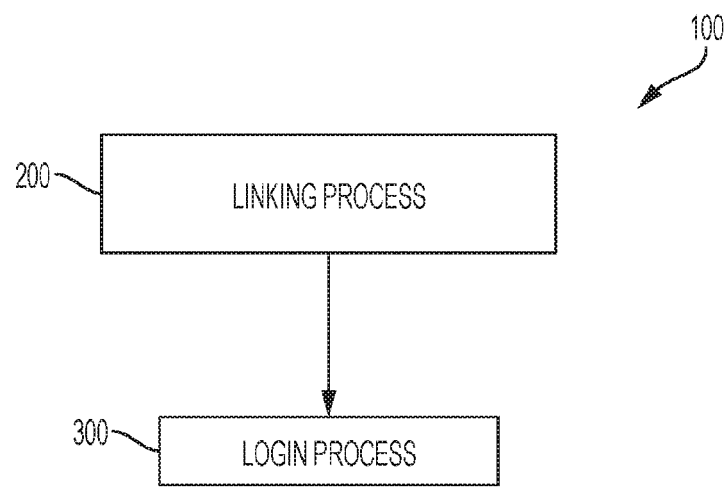
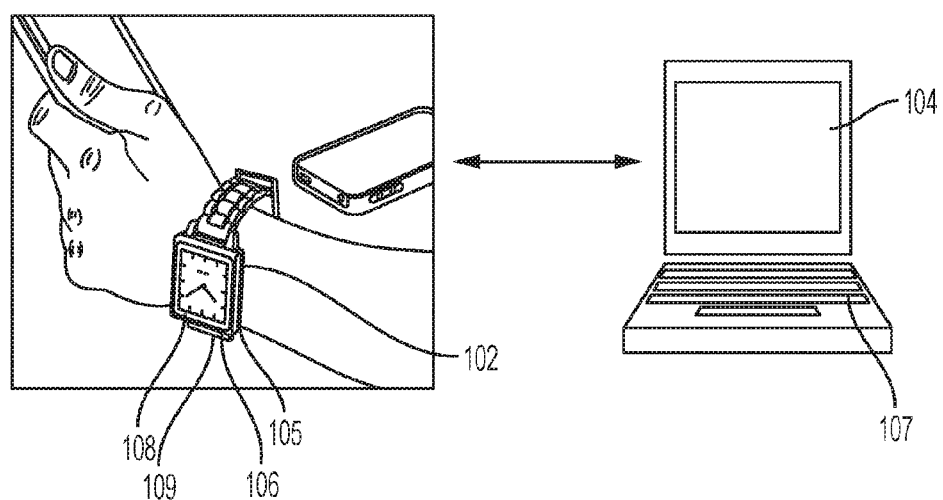
FIG. 1A
FIG. 1B

LOGIN WITH LINKED WEARABLE DEVICE

BACKGROUND OF THE INVENTION

The present invention generally relates to a security system for a restricted access environment and, more particularly, to a user login method for electronic systems such as computers.

A login system enables an individual to gain functional access to a restricted access environment, such as a computer system, by requiring self-identifying and/or user specific information (i.e. login information) from the user. Thus, a login system may serve to protect the privacy of information which may be stored on the environment. Although a login system does not protect a computer system from physical theft, it may serve as deterrence by disabling normal functioning of the system.

Typically, login information may be in the form of a secret username and/or password. However, as password identification may provide weak security, many systems require a user to set a complex password, and may require periodically changing the password. Such requirements may inconvenience the user and increase the chances that the user will forget the password.

Login information may also be in the form of biometric data such as the user's fingerprints or facial image. However, biometric identification is limited in the variations of data that can be used and may also be vulnerable to sophisticated hackers, who may contrive various schemes of obtaining an image of the biometric data.

Additionally, login information can be stolen (or guessed) and used for an extended period before, if at all, the theft is detected.

As can be seen, there is a need for an improved login method, which provides increased security and convenience.

SUMMARY OF THE INVENTION

In one aspect of the present invention, a login method for logging a user into a restricted access environment comprises linking a login device with the restricted access environment, according to a linking process; and logging into the restricted access environment via the login device, according to a login process, wherein the linking process comprises: associating the login device with the restricted access environment via a key stored in the login device, and wherein the login process comprises: providing an input signal by the user to the restricted access environment indicating user intent to login, wherein the input signal is actively inputted by the user, transmitting data between the login device and the restricted access environment, wherein the data is transmitted with the key stored in the login device, and determining whether to accept user authentication by the restricted access environment, wherein an acceptance of user authentication provides a user with functional access to the restricted access environment.

In another aspect of the present invention, a login method for logging a user into a restricted access environment comprises providing an input signal by the user to the restricted access environment indicating that the user wishes to login, wherein the input signal is actively inputted by the user; transmitting data between a login device and the restricted access environment, wherein the data is transmitted with a key stored in the login device, the key associating the login device with the restricted access environment; and determining whether to accept user authentication by the restricted access environment wherein an acceptance of user authentication provides a user with functional access to the restricted access environment, and wherein the restricted access environment comprises a computer environment.

In yet another aspect of the present invention A login device for effectuating a login process into a restricted access environment comprises a communication element configured to enable the login device to communicate with the restricted access environment; and a key storage element, configured to receive and store a key in the login device; wherein receiving the key from the restricted access environment, and transmitting the key to the restricted aces environment, is enabled by the communication element, and wherein the restricted access environment comprises a computer environment configured to allow functional access to an authenticated user.

These and other features, aspects and advantages of the present invention will become better understood with reference to the following drawings, description and claims.

BRIEF DESCRIPTION OF THE DRAWINGS

FIG. 1A illustrates a login method in accordance with an embodiment of the present invention;

FIG. 1B illustrates a login device and a restricted access environment for the login method of FIG. 1A;

DETAILED DESCRIPTION OF THE INVENTION

Figure 2:
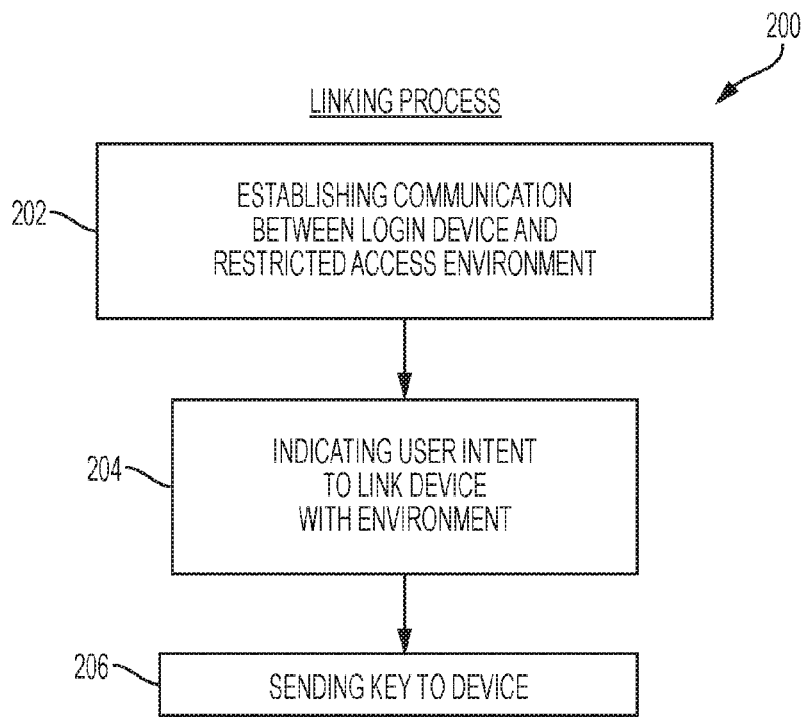
FIG. 2 is a flow chart for a linking process for the login method of FIG. 1A.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. However, any single inventive feature may not address any of the problems discussed above or may only address one of the problems discussed above. Further, one or more of the problems discussed above may not be fully addressed by any of the features described below.

Various inventive features are described below that can each be used independently of one another or in combination with other features.

Broadly, the present invention provides a login method for controlling user access into a restricted access environment with a login device, which may be a wearable device, to effectuate a login process.

With reference to FIGS. 1A-3, a login method 100 for logging into a restricted access environment 104 may comprise linking a login device 102 with the restricted access environment 104, according to a linking process 200, and logging into the restricted access environment via the login device 102, according to a login process 300, as shown in FIG. 1A. In embodiments, the login method 100 may have a user wear the device 102 in order to effectuate the login process 200.

The restricted access environment 104 may restrict functional access (i.e. as opposed to physical access) to authenticated users by requiring user authentication. In embodiments, the restricted access environment 104 may be a computer environment (as shown in FIG. 1B). In embodiments, the restricted access environment 104 may be a personal computer, desktop, laptop, tablet, iPad, webpage, email account, iCloud account, network, or combinations thereof. Additionally, other devices, including smart phones, and other mobile devices are within the scope of contemplated embodiments.

As illustrated in FIG. 2, the linking process 200 may comprise establishing communication between the device 102 and environment 104 (step 202). For example, communication may be via normal Bluetooth pairing. The linking process 200 may further include indicating user intent to link the device 102 with the environment 104 (step 204). For example, the environment 104 may send a request to the user, asking whether the user intends to use the device 102 for logging into the environment 104, to which the user may respond affirmatively. The linking process 200 may further include sending a secret (i.e., unique key) to the device 102 via the environment 104 to associate the device 102 with the environment 104 (step 206), wherein the key may be stored in a key storage element 109 of the device 102.

The linking process 200 may occur initially, and/or occasionally after a first time linking with environment 104, according to various embodiments. Additionally, once the device 102 is linked with the environment 104, a logout by the user may or may not cause the login device 102 to unlink to the environment 104. Thus, in various embodiments, once the device 102 is linked, the device 102 may be used to login multiple times, such that the device 102 does not require re-linking for every login.

In embodiments, a requirement to link the device 102 through the linking process 200 may be triggered by various events, such that the user may be required to link the login device 102 through the linking process 200 occasionally. Where the device is wearable, a requirement to link the device 102 may be triggered, when the user takes off the login device 102. For example, a sensor in the device may detect that the user has taken off the device, and cause the device to unlink. Accordingly, the user may wear the login device 102 at the start of a day, wherein the user may link the login device 102 with the environment 104, and take the device 102 off at the end of the day, wherein the device 102 may have to be re-linked with the environment 104 the following day, according to various embodiments.

Other events may trigger the requirement to re-link the login device. For example, the method 100 may include a set time period (i.e., 24 hours, 2 weeks, etc.), upon which the device may automatically require re-linking. Such time period may be set by the user, or may be preset by the method 100, or by a third party, according to various embodiments.

Additionally, embodiments wherein the linking process 200 may be required only once, as an initial setup process, or be provided pre-linked with environment 104, wherein user linking would not be required, are within the scope of contemplated embodiments. Alternate embodiments, wherein the device may unlink at every logoff, are also contemplated.

Figure 3:
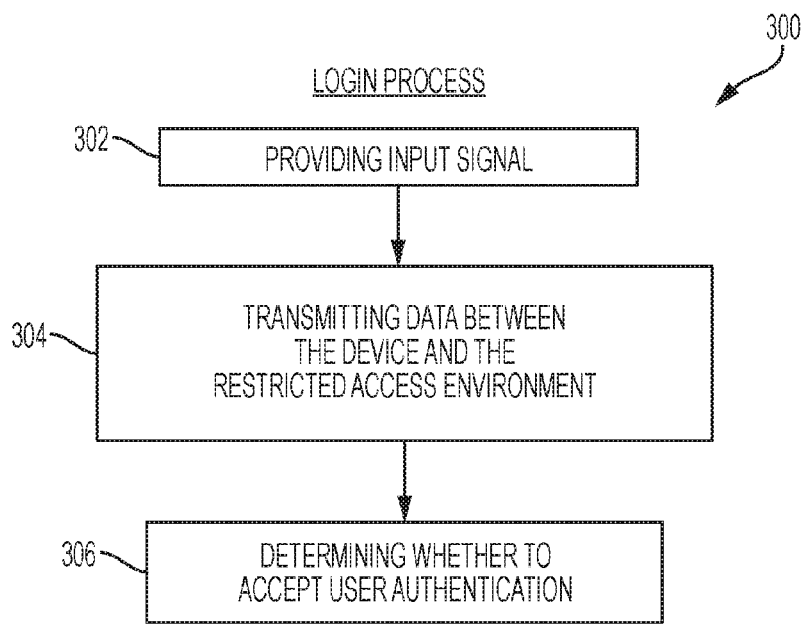
FIG. 3 is a flow chart for a login process for the login method of FIG. 1A.

Once the linking process 200 is complete, the login process 300 may be initiated, shown in FIG. 3. The login process 300 may include providing an input signal by the user to the environment 104, the input signal comprising an indication that the user wishes to login (step 302), wherein the environment 104 is activated (i.e., turned on) to receive the input signal. The login process 300 may further include transmitting data (e.g., through Bluetooth pairing) between the device 102 and the environment 104 (step 304), wherein the transmitted data may include the key sent to the device 102 according to step 206. In embodiments, the transmitted data may further be associated with the input signal. The login process 300 may further include determining whether to accept user authentication by the environment 104 (step 306). Such determination may be based on acceptance of the transmitted data in step 304, on the input signal of step 302, or both, wherein login would be allowed upon accepting authentication.

In embodiments, the user may actively input the input signal provided in step 302. For example, the input signal may be provided to a user input device 107 of the restricted access environment 104, such as a keyboard or keypad. In an embodiment, the input signal provided in step 302 may be a unique (i.e., secret) input signal. Such unique input signal may include a motion signal, which may be detected by a motion sensor 105 in the device 102, as well as by the environment 104. Such motion signal may be a unique signature set by the system and/or user, and may function as a "motive password." For example, where the environment 104 comprises a keyboard or keypad, the input signal may comprise rhythmically tapping at least one key. The input signal may comprise tapping with a finger of the hand wearing the device 102. Such rhythmic tapping may be defined by the number of taps, for example, which may be set by the environment 104 and/or user. The tapped key may be a specific key or any random key, or a set of specific and/or random keys.

When a user taps with a hand wearing the device, the rhythmic tapping may be detected by a sensor (such as a gravity sensor) in the device 102, and registered as input data by the device 102. The rhythmic tapping may simultaneously be detected and registered by the environment 104 based on the strokes on the keyboard or keypad. The input data associated with the rhythmic tapping, and detected by the device 102 (i.e. rhythmic data), may be transmitted to the environment 104 according to step 304, along with the key stored in the device 102. The environment 104 may determine whether to accept user authentication by comparing the data transmitted from the device 102 with the data registered by the environment 104, according to step 306, wherein authentication would be accepted upon a match of the compared data, and denied upon a mismatch of the data.

The login process 300 may further include comparing the rhythmic data with the preset motive password, by the device 102, wherein the rhythmic data would be transmitted upon a match, according to step 304; and/or by comparing the rhythmic data with the preset motive password, by the environment 104, wherein authentication would require a match, according to step 306.

The login method 100 may require the linking process 200 every time the user takes off the device, as described below. This may provide added security, for example, in embodiments where the input signal provided in step 302 is a unique input signal, unknown to a party who may be misappropriating the device 102.

In embodiments, the linking process 200 and/or the login process 300 may further incorporate a user password requirement for added security, or may provide a user with an option of using an added password. For example, step 204 of indicating user intent in the linking process 200 and/or step 302 of providing an input signal in the login process 300 may require a user password. For example, step 302 of providing an input signal may include pressing a specific key or set of keys on a keyboard or keypad, which may serve as a type of user password, in addition to, or instead of, a motive password. Thus, in embodiments wherein the login method requires a user to link the device 102 to the environment 104 every time the device 102 is taken off, a user password requirement may provide added security against a misappropriating party.

With reference back to FIG. 1B, the login device 102 may be an item which is wearable on a daily basis, such as a watch, which may be a smart watch, as shown in FIG. 1B. Other such wearable items may include, for example, a bracelet, glasses, headwear, etc., according to various embodiments. Additionally, non-wearable items are within the scope of contemplated embodiments.

The login device 102 may be configured to communicate with the restricted access environment 104 via a communication element 108. The communication element may be configured to communicate via a wireless connection, such as a Bluetooth 4.0 connection. However, a wired connection is within the scope of contemplated embodiments.

The login device 102 may be configured to associate with a single environment 104 (i.e., a single PC) or with multiple environments. For example, the login device 102 may be sold together with a PC, and may be configured to function only with the specific PC with which it was sold. In alternate embodiments, a single login device 102 may be used with different computer devices, networks, webpages, or a combination thereof. For example, the login device 102 may be provided with software, which may include downloadable software, to enable the device 102 to be established as a login device (i.e., linked) to one or more restricted access environments 104.

In embodiments, the wearable device 102 may further include a wear detection sensor 106 capable of detecting whether the user is wearing the device 102, and/or when a user has taken off the device 102. Such sensor 106 may include, for example, an optical sensor (e.g., positioned on a wrist contacting portion of the device), a gravity sensor, a motion sensor, etc., according to various embodiments. In embodiments, the device 102 may undo the linking process 200, disable the login process 300, and/or log off the user upon detection that a user is not wearing the device. For example, the device 102 may discard the key provided in step 206 of the linking process 200 upon detection that a user has taken off the device 102, thus disabling at least one of steps 304 and 306 of the login process 300.

The login device may further comprise a key storage element 109, and one or more sensors, which may include the wear detection sensor 106, and/or the motion sensor 105, as described above.

It should be understood, of course, that the foregoing relates to exemplary embodiments of the invention and that modifications may be made without departing from the spirit and scope of the invention as set forth in the following claims.

I claim:

1. A login method for logging a user into a restricted access environment having a user input device that includes a keyboard or keypad, comprising:
    linking a user wearable login device with the restricted access environment, according to a linking process;
    logging into the restricted access environment via the login device, according to a login process;
    logging out of the restricted access environment via the login device, according to a log out process;
    wherein the linking process comprises:
        associating the login device with the restricted access environment via a key stored in the login device, and
    wherein the login process comprises:
        providing an input signal by the user to the restricted access environment indicating user intent to login,
        wherein the input signal is actively inputted by the user via a keystroke of a key in the user input device,
    transmitting data between the login device and the restricted access environment, wherein the data is transmitted with the key stored in the login device, and
    determining whether to accept user authentication by the restricted access environment, wherein an acceptance of user authentication provides a user with functional access to the restricted access environment;
    wherein the input signal, resulting from the user's keystroke, is simultaneously detected by a sensor in the wearable login device and by the user input device of the restricted access environment;
    wherein determining whether to accept user authentication is based on a comparison of the input signal simultaneously detected by the login device and by the restricted access environment.

2. The login method of claim 1, wherein the login device is a watch.

3. The login method of claim 1, wherein the login process further comprises wearing the login device.

4. The login method of claim 1, wherein the login device is capable of detecting whether a user is wearing the login device.

5. The login method of claim 1, wherein the input signal is detected by the login device, wherein the data transmitted between the login device and the restricted access environment is associated with the input signal, and is transmitted from the login device to the restricted access environment.

6. The login method of claim 5, wherein the detection sensor comprises a motion sensor, and wherein the input signal detected by the login device comprises a motion signal.

7. The login method of claim 1, wherein the restricted access environment is a computer system.

8. The login method of claim 1, wherein one linking process can effectuate multiple login processes.

9. The login method of claim 1, wherein the linking process comprises establishing a communication between the login device and the restricted access environment, indicating user intent to link the login device with the restricted access environment, and sending the key to the login device by the restricted access environment.

10. A login method for logging a user into a restricted access environment having a user input device that includes a keyboard or keypad, comprising:
    providing an input signal by the user to the restricted access environment indicating that the user wishes to login, wherein the input signal is actively inputted by the user via a keystroke of a key in the user input device;
    detecting, by a user wearable login device, the input signal resulting from the user's keystroke;
    detecting, by the restricted access environment, the input signal resulting from the user's keystroke;
    wherein the input signal, resulting from the user's keystroke, is simultaneously detected by a sensor in the wearable login device and by the user input device of the restricted environment;
    transmitting data from the login device to the restricted access environment, wherein the data is transmitted with a key stored in the login device, the key associating the login device with the restricted access environment;

determining whether to accept user authentication by the restricted access environment wherein an acceptance of user authentication provides a user with functional access to the restricted access environment;

wherein determining whether to accept user authentication is based on a comparison of the input signal simultaneously detected by the login device and by the restricted access environment;

wherein the input signal is a tapping on the key by a user; and wherein the restricted access environment comprises a computer environment.

11. The login method of claim 10, further comprising linking the login device with the restricted access environment via a linking process to associate the restricted access environment with the login device, wherein the key stored in the login device is sent to the login device by the restricted access environment via the linking process.

12. The login method of claim 11, wherein the key stored in the login device is deleted upon an event triggering the linking process.

13. The login method of claim 10, wherein the login device is wearable by the user.

14. The login method of claim 12, wherein retaining the key stored in the device requires the user to wear the device.

15. The login method of claim 10, wherein data transmitted between the login device and the restricted access environment is associated with a unique motion signal detected by the motion sensor in the login device, and wherein the signal is transmitted from the login device to the restricted access environment.

\* \* \* \* \*